United States Patent [19]

Aignesberger et al.

[11] 4,296,089
[45] Oct. 20, 1981

[54] INORGANIC FIBERS

[75] Inventors: Alois Aignesberger, Trostberg, Fed. Rep. of Germany; Walter Lukas, Innsbruck, Austria; Ekkehard Weinberg, Trostberg, Fed. Rep. of Germany

[73] Assignee: Suddeutsche Kalkstickstoff-Werke, Trostberg, Fed. Rep. of Germany

[21] Appl. No.: 16,054

[22] Filed: Feb. 28, 1979

Related U.S. Application Data

[62] Division of Ser. No. 792,081, Apr. 28, 1977.

[30] Foreign Application Priority Data

May 14, 1976 [DE] Fed. Rep. of Germany ....... 2621611

[51] Int. Cl.$^3$ .................... C01F 11/46; C04B 11/00
[52] U.S. Cl. .................... 423/555; 106/109; 106/110; 106/306; 423/518; 423/556; 423/600
[58] Field of Search .................... 106/109, 306, 47 R, 106/110; 260/42.17; 75/0.5 R; 162/152; 423/518, 556, 555, 600

[56] References Cited

U.S. PATENT DOCUMENTS

| 879,603 | 2/1908 | Wallerstein | 423/555 |
| 4,029,512 | 6/1977 | Jaunarap et al. | 106/110 |
| 4,120,737 | 10/1978 | Berrie et al. | 106/109 |

FOREIGN PATENT DOCUMENTS

48-54929 of 1973 Japan .................... 423/113

*Primary Examiner*—Jacqueline V. Howard
*Attorney, Agent, or Firm*—Sprung, Felfe, Horn, Lynch & Kramer

[57] ABSTRACT

The invention provides inorganic fibers based on calcium sulfate dihydrate or calcium sulfate aluminate hydrate (or their dehydration products), wherein the ratio of average length to diameter of the fibers is more than 100:1 and the length of the fibers is at least 0.2 mm; preferably the ratio of average length to diameter is 300–800:1, and the length is 0.5–6 mm.

8 Claims, No Drawings

INORGANIC FIBERS

This is a division of application Ser. No. 792,081, filed Apr. 28, 1977.

The invention relates to inorganic fibers. More specifically, the invention relates to fibers based on calcium sulfate and calcium sulfate aluminate, and to the manufacture and use of such fibers.

Fibrous calcium sulfate dihydrate is known and occurs in nature, for example, as "fibrous gypsum" (GMELIN, "Calcium" (B) pp. 725–726).

Likewise, calcium sulfate aluminate hydrate has been found as a mineral (ettringite) in the basalt lava of Beller Mountain at Ettringen (Eifel), in the form of silky needles.

Calcium sulfate dihydrate, which is formed by the precipitation of calcium ions with sulfate ions, contains mainly prismatic and angular gypsum needles ("dovetail twins"), but it also contains lamellar structures. In the literature, occasional mention is made of the formation of relatively thick needles from calcium sulface dihydrate (Z. anorg. Chemie 155/141–143 [1926]).

The artificial production of ettringite from saturated aqueous $Ca(OH)_2$ solutions by precipitation with $Al_2(SO_4)_3$ solutions is likewise known. (Tonind.-Zt. 16 [1892] pp. 105–106).

These known products are not technically suitable for the reinforcement of matrix material, since they lack the appropriate fiber structure, especially the required ratio of length to diameter.

U.S. Pat. No. 3,822,340 and German Offenlegungsschrift (Published Specification) No. 23 14 645 disclose the production of whiskers on the basis of calcium sulfate hemihydrate and anhydrite by the recrystallization of commercial calcium sulfate dihydrate in the autoclave, as well as the use thereof in the reinforcement of various matrix materials.

The known short and relatively thick fibers (ratio of length to diameter = 6:1 to 100:1) are not, however, suitable for increasing the strength of paper, and as additives to plastics they produce only a relatively low increase in strength (cf. Examples 10, 11 and 15).

The present invention substantially overcomes this difficulty by providing crystalline fibers which are substantially longer than the previously known fibers and are suitable for the effective improvement of the strength of matrix materials.

The novel inorganic fibers of the invention are based on calcium sulfate dihydrate or calcium sulfate aluminate hydrate, or on their dehydration products, and are characterized by a ratio of average length to diameter of more than 100:1 and a length of at least 0.2 mm.

Preferably, these filaments have an average-length-to-diameter ratio of 300:1 to 800:1. The fiber length can attain as much as 10 mm. The preferred length amounts to 0.5 to 6 mm.

Often it is desirable for the fibers to have a suitable coating (dressing) of, for example, silanes, polyacrylamide, starch, polycarboxylic acid polymers, etc. This coating can produce the following effects depending on the chemical composition of the dressing and the nature of the matrix:

1. Improvement of the adhesion between fiber and matrix,
2. Reduction of the solubility of the fibers (in water, for example),
3. Prevention of the interference of the fiber as a chemical substance in the hardening of the plastic system.

The method of the invention for the preparation of calcium sulfate dihydrate fibers and of their dehydration products consists in the following:

(a) a dilute aqueous solution of at least one calcium salt is reacted at elevated temperature with a dilute aqueous solution of the stoichiometric amount of a water-soluble sulfate at pH values between 8 and 13, or (b) a dilute aqueous suspension of CaO and/or $CaCO_3$ is reacted at elevated temperature with excess dilute sulfuric acid, and then let stand, at elevated temperature in some cases, until the desired fiber length is achieved, or (c) synthetic or natural gypsum is suspended in water, proton donors are added, the gypsum is made to dissolve at elevated temperature, and the formation of fibers is brought about by the addition of aqueous sulfate solution and/or cooling of the reaction solution and/or concentration of the solvent, the fibers that form are separated from the solution upon reaching the desired length, and, in some cases, the dihydrate fibers thus obtained are wholly or partially dehydrated by heating at more than 100° C. in a water vapor atmosphere.

Typical examples of calcium salts which are used in Variant (a) are the calcium halides, such as calcium chloride, calcium nitrate and the like; suitable water-soluble sulfates are, for example, aluminum sulfate, sodium sulfate and ammonium sulfate. The preferred pH value in Variant (a) is between pH 9 and 12. Preferably, a calcium salt solution is used which contains 0.1 to 0.4 moles of calcium to the liter. Preferably, too, an 0.07 to 0.5× molar solution of a water-soluble sulfate is used. The reaction is performed preferably at a temperature between about 40° and about 105° C.

In Variant Method (b), a fourfold to twentyfold excess of sulfuric acid is used. The preferred temperature range in this case is between 40° and 95° C. The concentration can vary within wide limits, but preferably an 0.0025 to 0.05× molar suspension with respect to CaO is used, and it is especially preferred to use an 0.005 to 0.02× molar suspension of CaO or $CaCO_3$.

In the case of Variants (a) and (b), the achievable fiber length depends largely on the rate of cooling and the crystallization time. If, for example, the reaction solution is made to cool down from 60° C. to room temperature at a rate of 10°/h, the fibers achieve lengths of about 1 mm in one hour, about 2 mm in 6 hours, and up to 6 mm in 18 hours. The ratio of length to diameter of the fibers is mostly between 300 and 500:1 in the case of Variant (a), and between 300 and 800:1 in the case of Variant (b).

The term, "gypsum," as used herein with reference to the invention, is to be understood to mean dihydrate, hemihydrate and anhydrite. In the case of Variant (c), the recrystallization of dihydrate ($CaSO_4.2H_2O$) is preferred on account of the particularly great volume-time yield obtained in the formation of the fibers. The reaction takes place preferably between 40° and 105° C., especially between 80° and 100° C. Examples of especially suitable proton donors are hydrohalic acids such as HCl, nitric acid, dilute sulfuric acid, ammonium chloride, aluminum sulfate, or ammonium acetate.

Since gypsum solutions tend to become supersaturated easily, and gypsum is relatively easily soluble in aqueous solution in the presence of foreign ions, only about 60 to 70% of the product put in is precipitated in the first step of the reaction in the form of fibers, while the rest remains in solution. Therefore, after the separation of the fibers, the filtrate is preferably used as the reaction medium for the next batch, after replacement of the calcium sulfate removed by the precipitation. The fiber yield in the second and subsequent batches is then quantitative in each case with respect to the weight of sulfate used in replacement. In this preferred procedure, however, an excessively great accumulation of impurities in the reaction solution must be avoided, since otherwise they become incorporated markedly into the fibers. Consequently, the solution is freed of its impurities from time to time, depending on the purity of the starting substances.

The advantageous characteristics of the calcium sulfate dihydrate fibers of the invention remain unaltered in the temperature range up to about 100° C. for several hours. Above this temperature they become rapidly dehydrated and change to the polycrystalline state in which they lose their high specific tensile strength. In accordance with the invention, the high specific tensile strength is preserved even in the case of dehydration, if this dehydration is performed above 100° C. in a water vapor atmosphere. If the hydration is performed in this manner to the hemihydrate, approximately, any further dehydration that may be desired can be carried all the way to the completely anhydrous state, either in the presence of water vapor or by dry heating.

The production of the calcium sulfate aluminate hydrate fibers and their dehydration products is performed in accordance with the invention by reacting an aqueous calcium oxide solution with aluminum sulfate solution at elevated temperature, and the solution is cooled slowly for the formation of the fibers, the fibers are separated from the solution when they reach the desired length, and, if desired, they are wholly or partially dehydrated by heating at at least 80° C. Preferably, an 0.001 to 0.05 × molar calcium oxide solution is used. Especially good results are obtained by using 0.005 to 0.02 × molar calcium oxide solutions. The aluminum sulfate solution is preferably 0.01 to 0.2 × molar. The best results are obtained with a molar ratio of CaO to $Al_2(SO_4)_3$ of 3:1 to 12:1. The reaction takes place preferably in the temperature range between 20° and 90° C.

The calcium sulfate aluminate hydrate fibers or synthetic ettringite fibers thus obtained can be substantially dehydrated by dry heating at 80° to 120° C. Of 31 moles of water of crystallization, up to 24 moles are thus split off. Then, for complete dehydration of the fibers, the temperature can be raised to as much as 300° C. without impairment of the fiber characteristics.

Also, in this embodiment of the invention, the mother liquor is preferably recirculated, in which case yields of virtually 100% are achieved with respect to replaced CaO. In the fibers obtained, the ratio of length to diameter generally varies between 500 and 800:1.

On the basis of their high strength, the fibers of the invention can be used advantageously as additives for the improvement of the mechanical properties of matrix materials of all kinds. Preferably they are used for the reinforcement of plastics of all kinds, for improving the tear strength of paper, for the reinforcement of inorganic binding agents, for the manufacture of fabrics, insulating mats or fire protection mats, and the like. Here they show themselves to be superior to asbestos fibers, especially due to their non-toxicity. Likewise, they can be used instead of glass staple fibers in the applications in which the latter have hitherto been used.

A special advantage is the stability of the anhydrite fibers of the invention up to about 1100° C. This makes them generally suitable for the reinforcement of materials which melt below 1100° C., such as for example glass, or metals such as aluminum and aluminum alloys. The fibers of the invention can furthermore be used advantageously as flameproofing additives, and can reduce, for example, the combustibility of paper and the like. Their addition to matrix material increases especially the strength of same, especially their tensile strength. Lastly, the fibers of the invention containing water of crystallization have proven to be excellent foaming additives for foaming plastic compositions. In this manner, plastic foams of relatively high density are obtained, having especially high strength values.

EXAMPLES

EXAMPLE 1

A solution, heated at 70° C., prepared from 5.4 g of ammonium sulfate and 5.8 g of sodium sulfate, respectively, in 200 ml of water, is allowed to flow into a solution of 6 g of $CaCl_2.2H_2O$ in 500 ml of water, heated at 70° C. and adjusted with ammonia or soda lye to pH 11. The length of the fibers crystallizing upon the cooling of the reaction solution to room temperature reaches 1 to 2 mm in ½ hour, and 2 to 5 mm in 16 hours. The ratio of the length to the diameter of the calcium sulfate dihydrate fibers prepared amounts to 300:1 to 500:1.

Yield: approximately 5 g, corresponding to 70% with respect to the $CaCl_2$ put in.

If the solutions of 4.2 g of $CaCl_2.2H_2O$ in 20 ml of water (pH approx. 11) and 3.8 g of ammonium sulfate or 4.1 g of sodium sulfate, respectively, in 20 ml of water, are added simultaneously after heating at 70° C., to the filtrate from the preceding reaction solution, also heated to 70° C., the yield can be increased to approximately 100%. The fiber length reaches 1–2 mm after half an hour of standing, and 2 to 5 mm after half an hour.

EXAMPLE 2

A suspension of 2.2 g of CaO in 250 ml of water is heated at 60°; a solution of 20 ml of sulfuric acid in 450 ml of water is heated at 60° and added thereto, and this reaction solution is let stand at room temperature. After one hour the fibers are 1 to 2 mm in length, and after 18 hours 2 to 6 mm in length. The length-to-diameter ratio of the fibers attains from 500:1 to 800:1.

Yield: approx. 4 g, equivalent to about 65% with respect to CaO.

During the recirculation of the mother liquor, 1.3 ml of sulfuric acid is added to it, it is heated to 60°, and it is added to a suspension of 1.3 g of CaO in 100 ml of $H_2O$ after heating to 60°.

After several hours of standing at room temperature, the fibers attain lengths of up to 6 mm.

Yield: 3.5 g, equivalent to about 90% with respect to the CaO put in.

EXAMPLE 3

31 g of calcium sulfate dihydrate is dissolved at 90° in a mixture of 500 ml of water and 60 ml of 64% $HNO_3$, and the solution is allowed to cool at room temperature.

In ten minutes the fiber lengths amounts to 0.5 to 1.5 mm, and in 2 hours it is from 1 to 2 mm. The length-to-diameter ratio of the fibers attains 500:1.

Yield, approximately 25 g, equivalent to about 80%.

Another 25 g of calcium sulfate dihydrate solution is added to the filtrate and the mixture is heated again to 90°. Upon cooling, approximately 25 g of dihydrate fibers again precipitate.

In like manner, synthetic or natural gypsum can also be recrystallized from dilute hydrochloric acid or dilute sulfuric acid. The volumes required depend on the solubility of the gypsum in the acid.

EXAMPLE 4

15 grams of calcium sulfate dihydrate is dissolved in a mixture of 500 ml of $HNO_3$ at 60°; the solution is held at this temperature, and approximately 250 ml of water evaporates from the solution in the course of 10 hours. Calcium sulfate dihydrate fibers of 3 to 6 mm length are formed. The length-to-diameter ratio is 500:1.

Yield: approximately 10 g.

EXAMPLE 5

10 grams of calcium sulfate dihydrate fibers, prepared in accordance with Example 2, are heated in the autoclave in a water vapor atmosphere (at a pressure of 6 bars) for 6 hours at 130°, becoming substantially dehydrated and forming essentially monocrystalline calcium sulfate hemihydrate fibers.

EXAMPLE 6

10 grams of calcium sulfate dihydrate fibers, prepared in accordance with Example 2, are heated in the autoclave in a water-vapor atmosphere for 6 hours at temperatures above 100°. The calcium sulfate fibers that form, which still contain water of hydration, can be converted by dry heating at 450° to calcium sulfate anhydrite fibers.

Also, 16 hours of heating the calcium sulfate fibers containing water of hydration in the autoclave at 300°, and at a steam pressure of 15 bars, results in the formation of calcium sulfate anhydrite fibers.

EXAMPLE 7

An aqueous solution consisting of 700 mg of CaO per liter is heated at 70° and 0.1× molar aluminum sulfate solution at 70° is added until the molar ratio of CaO to $Al_2O_3$ is between 4:1 and 6:1. The reaction solution is cooled at a rate of 5° per hour. The crystallization of the ettringite fibers begins at about 55° C. and is completed in approximately 3 more hours. The fiber length amounts to 1-3 mm, and the length-to-diameter ratio is about 800:1.

The yield is 60 to 70%.

In the reuse of the mother liquor, an amount of CaO corresponding to the amount of ettringite fibers precipitated is added, the mixture is heated at 70°, and an amount of 0.1× molar aluminum sulfate solution heated to 70° is added which corresponds to the molar ratio. The ettringite fibers precipitating upon cooling achieve, after 6 hours, a length of 1 to 3 mm.

The yield is 100% with respect to the CaO.

EXAMPLE 8

The aqueous solution of 400 mg of CaO per liter is heated at 57° C. and an amount of one-tenth molar aluminum sulfate solution (57° C.) is added such that the molar ratio of CaO to $Al_2O_3$ will be 10:1. The pH value that establishes itself is 11.0. The reaction solution is held at a constant 50° C. for six hours, and then the ettringite fibers are filtered out. The yield is about 60%.

EXAMPLE 9

If the ettringite fibers obtained in accordance with examples 7 or 8 are heated dry at 80°–120°, up to 24 moles of water of crystallization can be removed from the 31 moles that are present. A further increase of the temperature to 300° C. results in the complete dehydration of the ettringite fibers without impairing their fiber characteristics.

EXAMPLE 10

In a laboratory pulp engine, ground spruce cellulose is mixed with various amounts of calcium sulfate dihydrate fibers of the invention, and 1% of a solution of a melamine-base wet-strengthening agent is added in the distributor.

The tear length of paper sheets prepared on the sheet maker and dried at 80°–100° C. was determined in accordance with the rules laid down in Specification 112 of the *Verein der Zellstoff- und Papier-Chemiker und -Ingenieure,* Edition of 1 June, 1949.

| Results: | |
|---|---|
| Amount of dihydrate fibers in wt.-% | Change of strength with respect to zero value |
| 5 | +36% |
| 10 | +27%* |
| 20 | −3% |
| 60 | −30% |

*The fibers prepared in accordance with German Offenlegungsschrift 2,314,645, when added in the amount of 10 wt.-%, reduce strength by 0.8%.

EXAMPLE 11

The calcium sulfate dihydrate fibers obtained in accordance with Example 3 are mixed with methacrylate resin and made into rods having overall dimensions of 1×4×16 cm, having a central portion measuring 1×1×5 cm. The tensile strength test gives the following results:

| Amount of dihydrate fibers in wt.-% | Change of strength with respect to zero value |
|---|---|
| 20 | +284%* |

*The fibers prepared in accordance with German Offenlegungsschrift 2,314,645, when added in the amount of 18% by weight, increase strength by only 70%.

EXAMPLE 12

Calcium sulfate dihydrate fibers prepared as in Example 1 are used as fillers for polyester bodies, and the tensile strength of the test specimens (see Example 11) is measured.

| | Results: | |
|---|---|---|
| Amount of asbestos fibers 7 RF 9 added wt-% | Amount of dihydrate fibers added wt-% | Change of strength from zero value |
| 10 | — | +34% |
| — | 10 | +148% |

EXAMPLE 13

1. Calcium sulfate anhydrite fibers prepared as in Example 6 are used in reinforcing epoxy resin, and the tensile strength of the test specimens (see Example 11) is measured.

| Filler | Results: Change of strength with reference to zero value |
|---|---|
| 2.2% chalk | +5.5% |
| 2.2% fibers (6) | +19.8% |

2. One liter of an aqueous suspension of 100 g of calcium sulfate dihydrate fibers, prepared as in Example 4, is stirred for 5 minutes with 1.5 ml of a 20% solution of a solfonated melamine-formaldehyde condensate; the fibers are then filtered out and dried.

The fibers thus treated, on the basis of their better adhesion in the matrix, result in higher tensile strengths in the fiber-reinforced epoxy resin (test specimens prepared as in Example 11).

| Fiber additive | Results: Change in strength with reference to zero value |
|---|---|
| 10% uncoated | +7% |
| 10% coated | +35% |

EXAMPLE 14

Calcium sulfate dihydrate fibers prepared as in Example 3 are used for reinforcing anhydrite (AB 200 8 1.5% $K_2SO_4$ as activator). Measurement is made of the tensile strength of test specimens measuring 1×4×16 cm, and of the flexural strength of specimens measuring 4×4×16 cm.

| | Results: Change in strength with reference to zero value | |
|---|---|---|
| Fiber additive | FTS | TS |
| 2% (3) | +14% | +22% |

EXAMPLE 15

The ettringite fibers obtained from Example 7 were used in the experimental conditions of Example 10 and the paper sheets were dried at 60°.

| Fiber additive Weight-percent | Results: Change in strength with reference to zero value |
|---|---|
| 5 | +36% |
| 10 | +17%* |
| 15 | −6% |

*The fibers prepared in accordance with German Offenlegungsschrift 2,314,645, when added in the amount of 10 weight-percent, produce an 0.8% reduction of strength.

EXAMPLE 16

Test specimens of acrylate and of polyester resin are reinforced with ettringite fibers of Examples 7, 8 and 9, by the procedures of Examples 11 and 12, respectively.

| Fiber additive weight-percent | Results: Change of tensile strength with respect to zero value |
|---|---|
| 2 (Ex. 7 and 8) | +13% |
| 10 (Ex. 7 and 8) | +62% |
| 10 (Ex. 9) | +64% |

EXAMPLE 17

100 grams of epoxy resin is mixed with 20 grams of calcium sulfate aluminate hydrate fibers containing water of crystallization; the proper amount of hardener is added, the plastic composition is poured into the mold to be filled with foam (ratio of volume of plastic to volume of the body to be molded is 1:4) and heated at 160°. The escaping water of crystallization blows the plastic composition to four times its initial volume.

The unusual strength of the foam plastic, plus its relatively high density, is amazing.

EXAMPLE 18

The ettringite fibers obtained as in Example 7 are used as specified in Example 10 for the purpose of reducing the combustibility of paper.

The test for fire resistance is performed on the basis of the VVK Specification "Packstoffprüfung" No. 17/61 (testing of packing materials).

Accordingly, the paper containing 60% ettringite fibers is flame-retardant according to 7.12., and paper containing 90% ettringite fibers is flame-retardant according to 7.13.

It will be understood that the specification and examples are illustrative but not limitative of the present invention and that other embodiments within the spirit and scope of the invention will suggest themselves to those skilled in the art.

What is claimed is:

1. Method for the preparation of calcium sulfate dihydrate fibers or their dehydration products having a ratio of average length to diameter of more than 100:1 and a length of at least 0.2 mm, which method comprises reacting a dilute aqueous solution of at least one calcium salt at elevated temperature with a dilute aqueous solution of the stoichiometric amount of a water-soluble sulfate at pH values between 8 and 13, the reaction mixture obtained to stand until the desired fiber length is achieved, and separating the fibers formed from the solution after achieving the desired length.

2. Method as claimed in claim 1 wherein the solution of calcium salt contains 0.1 to 0.4 moles of calcium ions.

3. Method as claimed in claim 1 wherein said water-soluble sulfate is used in the form of an aqueous 0.07× to 0.5× molar solution thereof.

4. Method as claimed in claim 1 wherein the reaction is carried out at a temperature from about 40° to 105° C.

5. Method as claimed in claim 1 wherein the reaction is carried out with a water-soluble sulfate at a pH from 9 to 12.

6. Method as claimed in claim 1 wherein said water-soluble sulfate is at least one of $Al_2(SO_4)_3$, $Na_2SO_4$ or $NH_4)_2SO_4$.

7. Method as claimed in claim 1 wherein said soluble calcium salt is a calcium halide or calcium nitrate.

8. Method as claimed in claim 1, further comprising dehydrating the dihydrate fibers thus obtained wholly or partially by heating in a water-vapor atmosphere at over 100° C.

* * * * *